(12) United States Patent
Gu et al.

(10) Patent No.: US 9,612,653 B2
(45) Date of Patent: Apr. 4, 2017

(54) INTEGRATED CIRCUIT WITH SELECTABLE POWER-ON RESET MODE

(71) Applicant: FREESCALE SEMICONDUCTOR, INC., Austin, TX (US)

(72) Inventors: Wen Gu, Tianjin (CN); Jing Cui, Tianjin (CN); Shayan Zhang, Cedar Park, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 5 days.

(21) Appl. No.: 14/845,114

(22) Filed: Sep. 3, 2015

(65) Prior Publication Data

US 2016/0231806 A1 Aug. 11, 2016

(51) Int. Cl.
*G06F 1/32* (2006.01)
*G06F 9/44* (2006.01)
*G06F 1/24* (2006.01)
*G06F 1/30* (2006.01)

(52) U.S. Cl.
CPC .............. *G06F 1/3296* (2013.01); *G06F 1/24* (2013.01); *G06F 1/30* (2013.01); *G06F 1/324* (2013.01); *G06F 1/3206* (2013.01); *G06F 1/3243* (2013.01); *G06F 9/4418* (2013.01)

(58) Field of Classification Search
CPC .............................. G06F 1/3296; G06F 9/4418
USPC ....................................................... 713/323
See application file for complete search history.

(56) References Cited

U.S. PATENT DOCUMENTS

| | | | |
|---|---|---|---|
| 4,611,289 A | 9/1986 | Coppola | |
| 4,980,836 A | 12/1990 | Carter et al. | |
| 5,218,704 A | 6/1993 | Watts et al. | |
| 5,396,635 A | 3/1995 | Fung | |
| 5,504,907 A | 4/1996 | Stewart et al. | |
| 6,509,768 B2* | 1/2003 | Polizzi | H03K 17/223 327/143 |
| 6,629,265 B1* | 9/2003 | Williams | G06F 1/24 713/323 |
| 6,665,802 B1 | 12/2003 | Ober | |
| 6,792,527 B1* | 9/2004 | Allegrucci | G06F 1/24 711/166 |
| 7,181,188 B2 | 2/2007 | Vu et al. | |
| 7,348,816 B2* | 3/2008 | Shin | H03K 17/223 327/142 |
| 7,653,822 B2 | 1/2010 | Schaver | |

(Continued)

*Primary Examiner* — Chun Cao
(74) *Attorney, Agent, or Firm* — Charles E. Bergere

(57) ABSTRACT

An integrated circuit (IC) and associated method support using a pre-use configuration for determining an initial/preferred operational mode for the IC from plural operational modes that may be entered following power-up cycles of the IC. The initial/preferred operational mode can be determined after the design phase of the IC so that, during IC operation, wasted power or delay are not incurred by first requiring that the IC power up in a default operational mode and subsequently run executive code to reprogram the IC to enter an operational mode that is preferred for the application for which the IC is being used by the IC integrator/user. The configurations determine clock frequencies and/or power levels for core processing and/or peripheral modules and allow the same IC design/die to be targeted to a spectrum of different power usage/performance applications by the integrator/user.

11 Claims, 4 Drawing Sheets

(56) References Cited

U.S. PATENT DOCUMENTS

2012/0242380 A1* 9/2012 Edwards .......... G01R 31/3004
327/143
2013/0145193 A1* 6/2013 Takahashi ................ G06F 1/24
713/323
2014/0089707 A1 3/2014 Jouin et al.

* cited by examiner

| PUC-0 | PUC-1 | Core 110 | Core 120 | Periph 130 | Periph 140 |
|---|---|---|---|---|---|
| 0 | 0 | Low Freq | Low Freq | Low Pow | Low Pow |
| 0 | 1 | Low Freq | Nom Freq | Low Pow | High Pow |
| 1 | 0 | Nom Freq | Low Freq | High Pow | Low Pow |
| 1 | 1 | Hi Freq | Nom Freq | High Pow | High Pow |

INTEGRATED CIRCUIT WITH SELECTABLE POWER-ON RESET MODE

BACKGROUND OF THE INVENTION

The present invention relates generally to the operation of integrated circuits (ICs) at power-up, and more particularly to methods of pre-configuring initial operational modes of an integrated circuit to be entered upon power up.

Various integrated circuits, e.g., microcontrollers and systems-on-a-chip (SoCs), are used in portable, battery-powered devices, such as laptop computers and cellular phones. An important concern in any battery-powered device is extending the amount of time the device can be used before the battery requires recharging.

There are a number of techniques used to provide power management to the various subsystems within such devices in order to conserve battery power and to meet energy-star requirements. Most of these techniques depend upon some monitoring of the various subsystems by code executing on the processing subsystems of the hardware. For example, some computer systems, such as those disclosed in U.S. Pat. No. 4,980,836 ("the '836 patent"), utilize centralized, power management control of various peripheral devices, such as floppy-disk drives and hard-disk drives, in order to conserve battery power.

More particularly, in the system disclosed in the '836 patent, access to the various peripheral devices, such as the floppy-disk drive and the hard-disk drive, is monitored. If the peripheral devices have not been accessed for a predetermined amount of time, the peripherals and/or the computer system may be placed in a low-power state by a centralized, power management control logic circuit.

To achieve the low-power state, the system clock frequency may be reduced in order to reduce the power consumption of the device. By stopping the system clock, the power consumption is significantly reduced, particularly since CMOS devices typically used in such SoCs use extremely low power at zero frequency. Other power management schemes may use a reduction in voltage or a combination of frequency and voltage management schemes to conserve power in low-power modes.

However, in the above scenarios, a significant amount of time may pass between when the system powers up and when the peripherals are placed into the low-power state. During this time, a good deal of energy may be lost unnecessarily.

In other IC power management schemes, power is managed at a system-on-a-chip (SoC) or multi-chip module (MCM) level rather than on a system level. For example, U.S. Pat. No. 6,665,802 discloses a decentralized power management scheme where the peripherals themselves are in control of their own power usage state (e.g., high or low).

In U.S. Pat. No. 7,181,188, a method and apparatus are disclosed for an SoC to enter a low-power mode following a trigger from a power master.

Some exemplary ICs featuring advanced clock and power management techniques are included in the i.MX280 Multimedia Applications Processor family manufactured by Freescale Semiconductor, Inc. of Austin, Tex. A datasheet for this family of SoCs may be downloaded from http://cache.freescale.com/files/32 bit/doc/data_sheet/IMX28CEC.pdf?pspll=1. The datasheet is incorporated herein by reference in its entirety.

ICs are developed in a series of steps. At a top level, ICs are typically designed using a hardware description language such as Verilog or VHDL. The language is run through a hardware compiler and simulator, and then eventually the design phase culminates with "tape-out," the point at which artwork for an IC photomask is sent to a wafer fabrication facility. Following tape-out, a wafer is manufactured that includes one or more copies of the IC, the copies being known as semiconductor dies. Following wafer fabrication, wafer testing is performed, then the IC dies are cut from the wafer and further testing, configuration, and packaging of the dies is done.

For some ICs, during the design phase, the ICs are targeted for a specific application, such as remote sensing, where power is at a premium. Such ICs may be designed to power up directly into a low-power mode following application of power. These ICs might not have the flexibility to run code after they boot to change their operational mode. However, even if they can change their operational mode after booting up, these ICs will waste time (and power) changing from a low-power and typically lower performance operational mode to the potentially desired higher performance operational mode.

Some ICs/SoCs may support a wide variety of run-time applications requiring different power profiles, but they must always reach these different power profiles after executing code in their default power-up profile. For example, a SoC used in a cell phone may power up in a default operational mode, check the battery status, and adjust its operating mode to a lower-power mode, where, for example, the primary graphics display driver is powered down.

Disadvantageously, such an SoC always first passes through its default operational mode before being programmed into a lower-power, high performance, or otherwise preferred state, thereby wasting energy in the time spent in the normal operational mode as well as in the power-mode transition itself. Further, when the preferred mode is a high-performance mode, a SoC that boots to a default mode before it can change to the high performance mode will appear less responsive than one that is designed to boot directly to a high performance mode. A SoC may be designed to run in a low-power state, for example, for application in a satellite telemetry system, but this same SoC may never be used in a high power application.

Thus, additional flexibility in the utilization of the same IC design for various power/performance profiles is desired so that one IC design may be used in a variety of applications.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale. For example, the thicknesses of layers and regions may be exaggerated for clarity.

FIG. 2 is a truth table illustrating possible initial operational modes for the SoC of FIG. 1;

DETAILED DESCRIPTION OF THE INVENTION

Detailed illustrative embodiments of the present invention are disclosed herein. However, specific structural and functional details disclosed herein are merely representative for purposes of describing example embodiments of the present invention. The present invention may be embodied in many alternative forms and should not be construed as limited to only the embodiments set forth herein. Further, the terminology used herein is for the purpose of describing particular embodiments only and is not intended to be limiting of example embodiments of the invention.

As used herein, the singular forms "a," "an," and "the," are intended to include the plural forms as well, unless the context clearly indicates otherwise. It further will be understood that the terms "comprises," "comprising," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
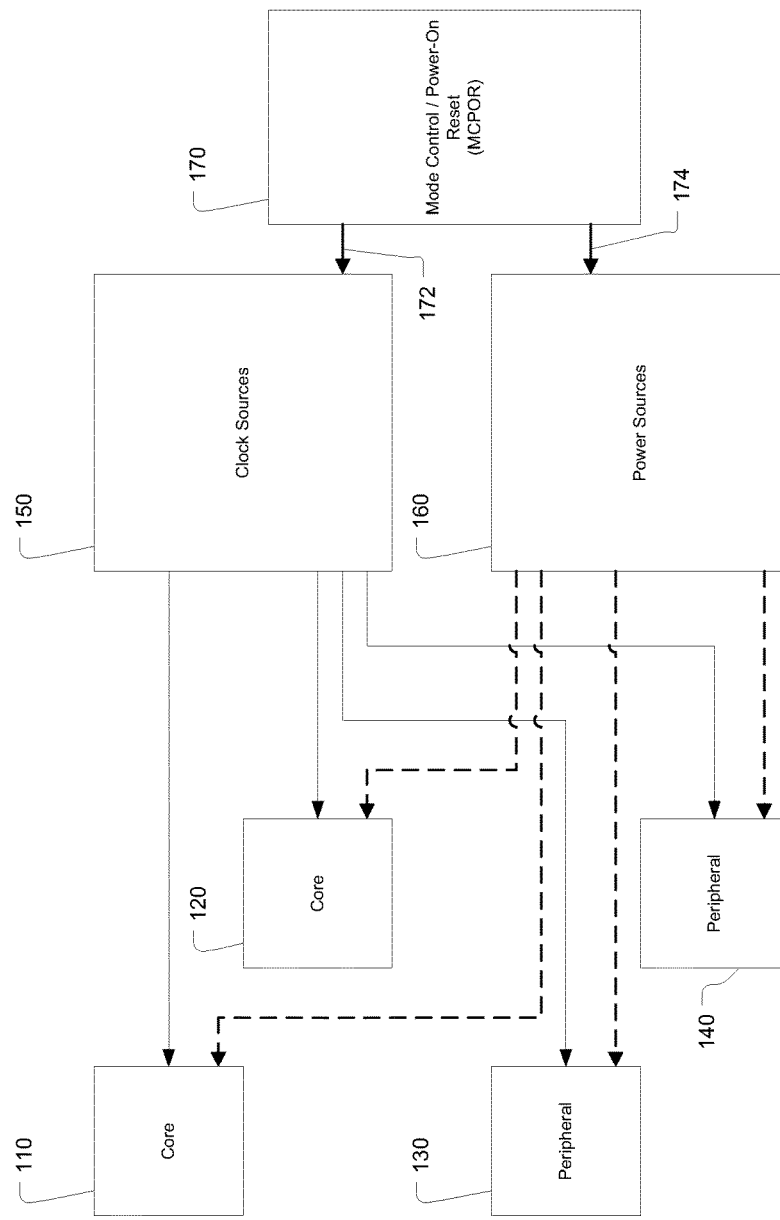
FIG. 1 is a block diagram illustrating a system-on-a-chip according to one embodiment of the present invention.

FIG. 1 is a simplified block diagram illustrating a system-on-a-chip 100 according to one embodiment of the present invention. The SoC 100 includes processing cores 110 and 120, peripheral modules 130 and 140, a clock sources module 150, a power sources module 160, and a mode control/power-on reset (MCPOR) module 170.

In operation, following application of power to the SoC 100, and before the majority of the SoC circuitry is taken out of reset (i.e., while the cores 110 and 120 and the peripherals 130 and 140 are still in reset), the MCPOR module 170 provides a clock sources control signal 172 to the clock sources module 150 and a power sources control signal 174 to the power sources module 160.

The MCPOR module 170 generates the clock sources control signal 172 and the power sources control signal 174 as a function of a configuration of the SoC 100 that is performed at the time of manufacture of the SoC 100 (e.g., after tape-out, potentially at the time of wire bonding, packaging, testing, or just prior to shipping the SoC 100 to an assembler or integrator), or at the time of integration of the SoC 100 into a module, printed circuit board, or product by an integrator).

This "pre-use" configuration may be accomplished by blowing one or more fuses or anti-fuses within the circuitry of the SoC 100 (e.g., using a programmable logic device programming device or by using a programmable array logic programming device, herein referred to generically as a logic programming device), by bonding certain inputs of the SoC 100 to power or ground planes during packaging, by wiring certain leads of the SoC 100 to power/ground planes during circuit board assembly or during system integration or field use (e.g., by setting of DIP switches), or by pre-loading a non-volatile memory or register within the MCPOR module 170 with a bit pattern corresponding to a desired pre-use configuration for the SoC 100, which non-volatile configuration memory may be read during the power-up of the chip to allow the MCPOR module 170 to determine an initial operational state that the SoC 100 will enter following global power-on re-set de-assertion.

As a function of the clock sources control signal 172, the clock sources module 150 may select an independent clock source for each of the processing core modules 110 and 120 and each of the peripheral modules 130 and 140 (e.g., each with a potentially different frequency or duty cycle or gating function). In this way, the pre-use configuration of the MCPOR module 170 may be used to choose a zero-, low-, medium-, or high-frequency clock for each of the core/peripheral modules 110, 120, 130, and 140, providing flexibility in selecting the power use associated with an initial operational mode of the SoC 100.

As a function of the power sources control signal 174, the power sources module 160 may select an independent power source for each of the processing core modules 110 and 120 and each of the peripheral modules 130 and 140 (e.g., each with potentially different voltage and current characteristics). In this way, the pre-use configuration of the MCPOR module 170 may be used to choose a different power supply for each of the core/peripheral modules, providing additional flexibility in selecting the power use associated with an initial operational mode of the SoC 100.

The MCPOR module 170 may also communicate other commands directly to the core/peripheral modules 110, 120, 130, and 140 via command/control lines (not illustrated) which may affect the amount of power those modules will draw. For example, the MCPOR module 170 may communicate a "sleep until interrupt" command to the peripheral module 130 before the peripheral module 130 is taken out of power-on reset. If the peripheral module 130 is, for example, an Ethernet controller interface, it would otherwise draw a good deal of power between the time the SoC 100 powers up and the time that a real-time operating system is loaded and has the time to even respond to communication requests from the Ethernet controller and/or decide, given the usage scenario for the SoC 100, whether the Ethernet controller should be told to sleep or told to be shut off entirely.

In another example, the core 110 may be the processing element of the SoC that is designed to run the critical "quick on" user-interface functions for a product (e.g., a cellphone). In this scenario, the pre-use configuration of the SoC 100 may be set such that the MCPOR module 170 chooses an initial operational mode for the SoC 100 that overclocks the core 110, while under-clocking the core 120, so that, on balance, the SoC 100 takes an average amount of power and yet has a very responsive boot-up and responsiveness characteristic from the end-users perspective, allowing the end-user to access high-priority features such as clock, power remaining, and time-of-day features of a cellphone, for example. Such a pre-use configuration could be set by the product manufacturer, the product distributor, or even the end-user.

For simplicity, other control and data signals, data and code busses, and other interconnection circuitry commonly seen in a SoC of this type have been left out of the block diagram of FIG. 1.

Although the functions of the cores 110 and 120, the peripherals 130 and 140, the clock sources 150, the power sources 160, and the MCPOR module 170 are shown as separate elements in the block diagram of FIG. 1, in various other embodiments, those functions may be distributed or grouped differently as suited to the purpose of the SoC 100.

For example, in some embodiments, one or more of the cores 110 and 120 or the peripherals 130 and 140 may have their own clock-generation or voltage-regulation circuitry, and each may determine its initial operational mode independently, as long as per the invention, the initial operational mode determination is made as a function of a pre-use configuration for the SoC 100. In some cases, this pre-use configuration may itself be distributed and independently applied to each or a subset of modules.

FIG. 2 is a truth table 200 illustrating possible initial operational modes for the SoC 100 of FIG. 1 as a function of the value of two pre-use configuration bits PUC-0 and PUC-1, according to one embodiment of the present invention.

Row 210 details an initial operational mode of the SoC 100 corresponding to pre-use configuration values {PUC-0, PUC-1} equal to {0,0}. For these pre-use configuration values, each time the SoC 100 is taken out of power-on reset (e.g., the first time it is ever powered up, and each subsequent time it is powered up if the pre-use configuration bits are not modified during operation or via external changes), the cores 110 and 120 will power up, each running with a low-frequency clock, and the peripherals 130 and 140 will both power up running from a low-voltage power source. Following power up, the SoC 100 will run in this initial operational mode until the operational mode is changed by the firmware/operating system (OS) that ultimately boots up on the SoC 100 and potentially changes the operational mode based on user, system, or external inputs.

After an operating system takes control of the SoC 100, the operating system may put one or more modules of the SoC 100 into a shut-down or sleep mode, potentially shutting down one or more cores and putting the SoC 100 into a non-operative mode which may only be exited via receipt of, for example, an interrupt, one of various watchdog resets, or a power-on reset. Assuming no override has occurred of the initial operational mode selection logic based on the pre-use configuration, following such interrupts or resets, the SoC 100 will again enter the initial operational mode defined by row 210 and corresponding to the settings of the pre-use configuration.

Of the initial operational modes detailed in the rows of exemplary truth table 200, the initial operational mode detailed by row 210 corresponds to the lowest-power operational mode. An SoC integrator may choose to program a {0,0} into power-use configuration register bits {PUC-0, PUC-1} for the SoC 100 in an effort to minimize the power draw of the SoC 100 in operation, for example, in a tablet or cellphone application. The operational mode of the SoC 100 may at times be changed by the end-user, or it may end up that most if not all of the time, the SoC 100 (whose pre-use configuration may be set in the SoC chip factory or during integration by the setting of the PUC bits corresponding to row 210 of the truth table 200) is run in its initial operational mode, making the initial operational mode the typical or preferred operational mode for the SoC 100.

In embodiments where the initial operational mode that is entered upon power-up as a function of the pre-use configuration is not later overridden, the initial operational mode of the SoC 100 will also be the primary operational mode.

Row 220 details the initial operational mode of the SoC 100 corresponding to pre-use configuration values {PUC-0, PUC-1} equal to {0,1}. For these pre-use configuration values, each time the SoC 100 is taken out of power-on reset, the SoC 100 will power up into an initial operational mode, where the core 110 runs with a low-frequency clock, the core 120 runs with a nominal-frequency clock and the peripherals 130 and 140 will power up running with low-voltage and high-voltage power sources, respectively.

Row 230 details the initial operational mode of the SoC 100 corresponding to pre-use configuration values {PUC-0, PUC-1} equal to {1,0}. For these pre-use configuration values, each time the SoC 100 is taken out of power-on reset, the SoC 100 will power up into an initial operational mode, where the core 110 runs with a nominal-frequency clock, the core 120 runs with a low-frequency clock, and the peripherals 130 and 140 will power up running with high-voltage and low-voltage power sources, respectively.

Row 240 details the initial operational mode of the SoC 100 corresponding to pre-use configuration values {PUC-0, PUC-1} equal to {1,1}. For these pre-use configuration values, each time the SoC 100 is taken out of power-on reset, the SoC 100 will power up into an initial operational mode where the cores 110 and 120 will be operated with high- and nominal-frequency clocks, respectively, and the peripherals 130 and 140 will both power up running with high-voltage power sources.

Figure 3:
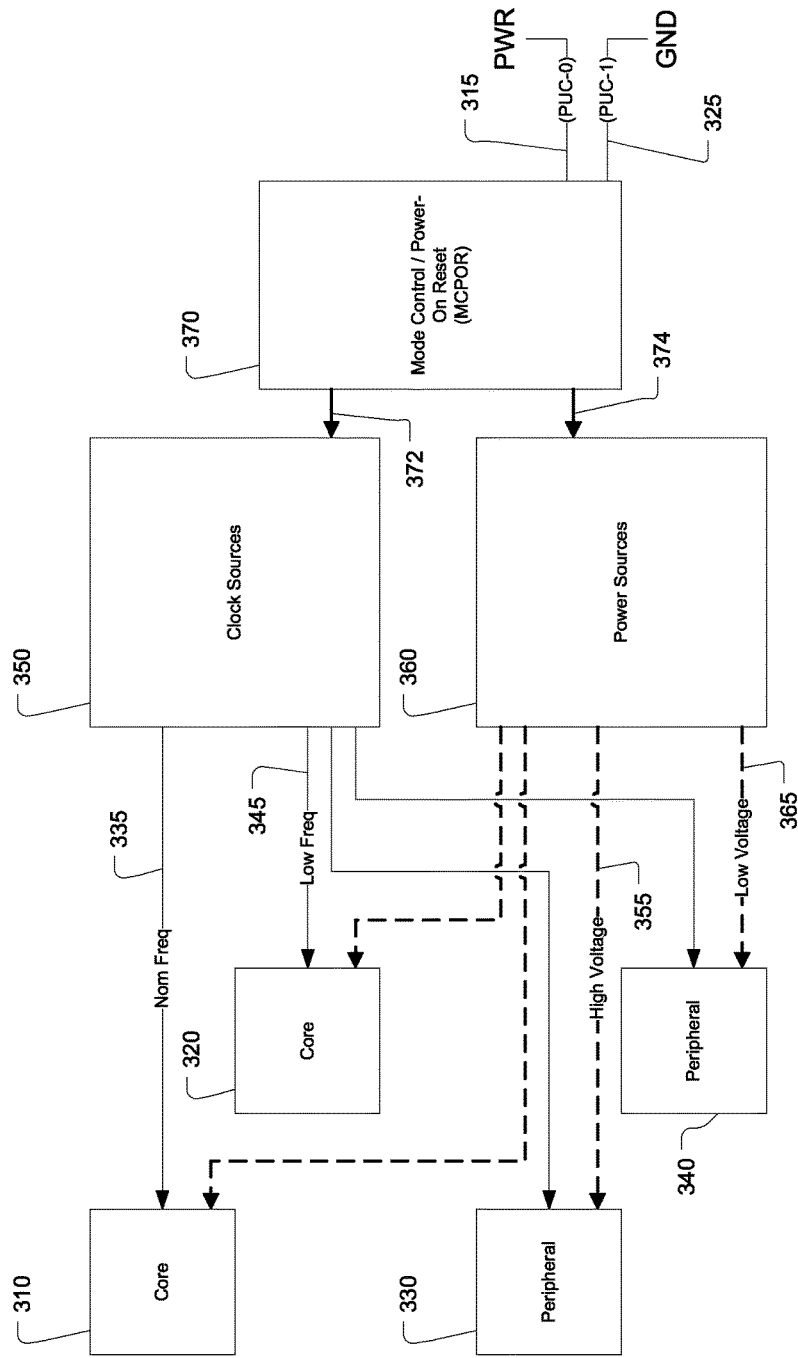
FIG. 3 is a simplified block diagram illustrating an SoC according to another embodiment of the present invention.

FIG. 3 is a simplified block diagram illustrating an SoC 300 according to an embodiment of the present invention Elements in FIG. 3 that are analogous to elements in the SoC 100 of FIG. 1 are analogously labeled. FIG. 3 highlights two external connections, 315 and 325, to the MCPOR module 370, which connections correspond to pre-use control inputs/register bits PUC-0 and PUC-1, respectively.

In this embodiment, the input 315, corresponding to PUC-0 of the truth table 200 of FIG. 2, is tied to PWR (a logical "1"), and the input 325, corresponding to PUC-1 of the truth table 200 of FIG. 2, is tied to GND (a logical "0"). This pre-use configuration may have been fixed at the time of integration of the SoC 300 into a product, such as a laptop, cellphone, portable music player, or navigator (e.g., via hard wiring or DIP switch settings).

This pre-use configuration of {PUC-0,PUC-1}={1,0} corresponds to row 230 of FIG. 2. In this case, as illustrated in FIG. 3, the core 310 would receive a nominal-frequency clock 335, while the core 320 would receive a low-frequency clock 345, and the peripheral 330 would receive a high-voltage power source 355, while the peripheral 340 would receive a low-voltage power source 365.

In alternative embodiments where multiple clocks and multiple voltages are supplied in common directly to each of the core and peripheral modules, the clock signal wires 335 and 345 and voltage wires 355 and 365 may be replaced with clock selection and voltage selection control signals, respectively, that tell each module which clock and which voltage to use of the various frequencies and voltages available to them. As noted earlier, in some embodiments, some of the modules may be able to generate their own clocks and voltages, and the control lines then serve to control the selection of those voltages and frequencies.

In operation, following application of power to the SoC 300, and before the majority of the SoC circuitry is taken out of reset (i.e., while the cores 310 and 320 and the peripherals 330 and 340 are still in reset), the MCPOR module 370 applies the inputs 315 and 325 to decoder logic that uses these inputs to generate the clock sources control signal 372 and the power sources control signal 374. Alternatively or additionally, inputs 315 and 325 may be used to initialize a NVM configuration, which on subsequent power cycles is used as the pre-use configuration for the SoC and is decoupled from further influence by the external inputs 315 and 325.

In either case, the clock sources control signal 372 is then used by the clock sources module 350 to determine the frequency of the clock signal 335 sent to the core 310 and the frequency of the clock signal 345 sent to the core 320. Also, the power sources control signal 374 is used by the power sources module 360 to determine the voltage level 355 sent to the peripheral 330 and the voltage level 365 sent to the peripheral 340.

Note that, in this embodiment, the frequency of the clocks for the peripherals 330 and 340 and the voltage levels for the cores 310 and 320 are not specified by the pre-use configuration and are therefore set to nominal default values during power up of the SOC 300. Although these particular clock frequencies and voltage levels are not specified by the pre-use configuration and are assumed to start out with default values, in some embodiments, they might additionally be later programmable by the SoC 300 under operating system control after the SoC 300 has booted up.

In some embodiments of the present invention, the clock sources circuitry of FIGS. 1 and 3 150/350 might be included as a portion of power sources circuitry 160/360 or vice versa, or distributed to one or more of the core and/or peripheral modules 110/310, 120/320, 130/330, and/or 140/340.

In various embodiments, the clock sources module 150/350, the power sources module 160/360, the MCPOR module 170/370, the core modules 110/310 and 120/320, and the peripheral modules 130/330 and 140/340 may include different types of current-consuming circuitry including voltage regulators, current sources, bandgap regulators, charge pumps, analog-to-digital converters, digital-to-analog converters, radio-frequency circuitry, amplifier circuitry, phase lock loops, and other analog or mixed signal circuitry.

Figure 4:
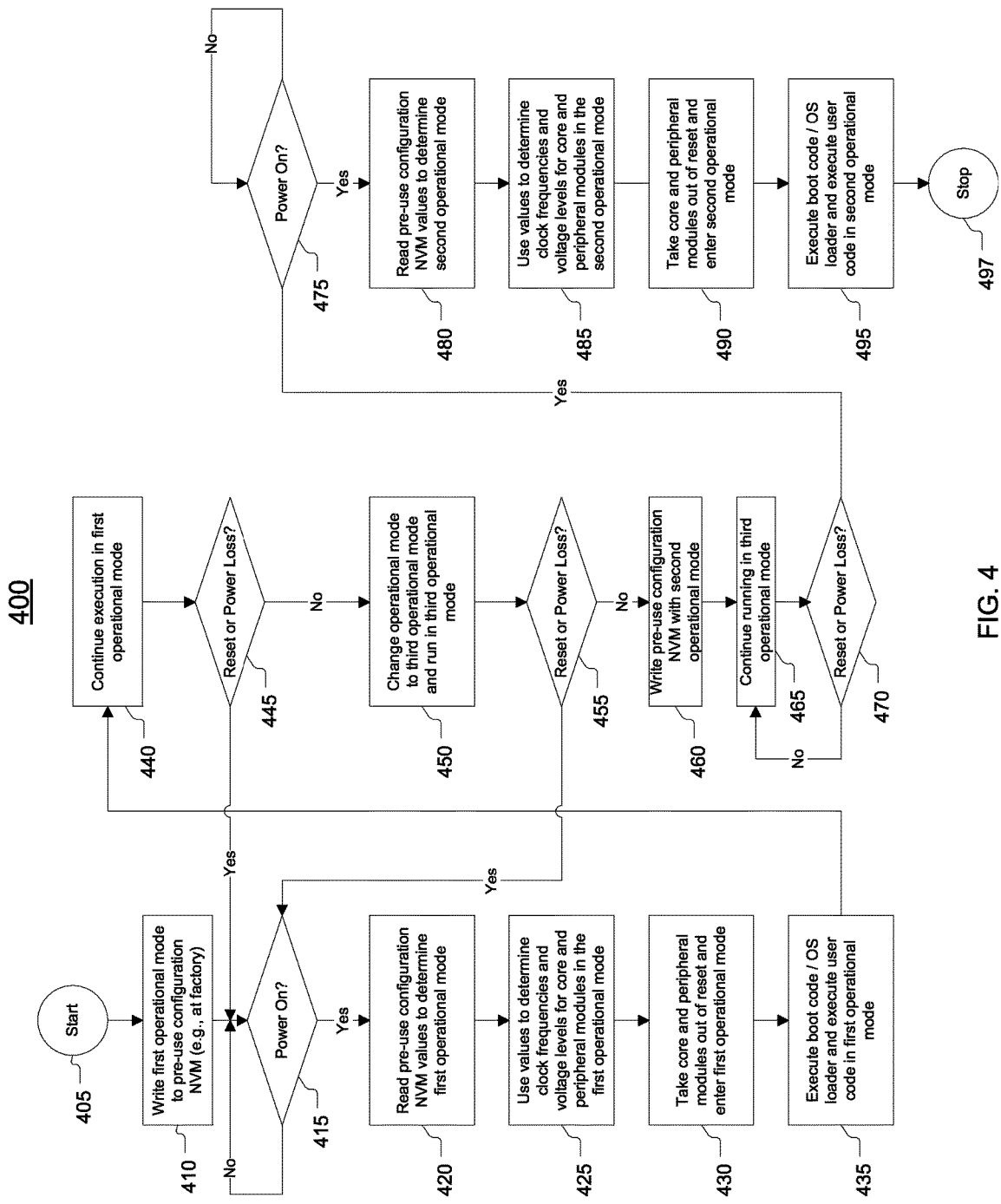
FIG. 4 is a flow chart illustrating one possible example of the operation of the SoC of FIG. 3.

FIG. 4 is a flow chart 400 describing one possible example of the operation of the SoC 300 of FIG. 3.

The flow starts in step 405. In step 410, a first operational mode for the SoC 300 is written to a pre-use configuration non-volatile memory (NVM) (not shown) within the MCPOR 370. For example, in reference to the truth table 200 of FIG. 2, the NVM may be written with the value {1,0} corresponding to {PUC-0,PUC-1} equal to {1,0} and associated with row 230 of the truth table 200.

Note that the "first" operational mode does not necessarily correspond to the first operational mode specified in the truth table 200 but is rather an initial operational mode the integrator has chosen for the SoC 300 in the target product application. This first operational mode might, on average, use more or less power, or provide higher or lower benchmark processing capability than a second or third operational mode that is selectable for the SoC 300.

In the embodiment of FIG. 4, it is anticipated that the pre-use configuration is written in a location within an NVM within the SoC 300 that can be written by a chip programming step, similar to an EPROM burning step or boundary scan test procedure, initiated external to the SoC 300. In other embodiments, the pre-use configuration may be set by dip switches on a module or circuit board or by other means such as SoC leads bonded high or low, or wired external to the package to appropriate logic levels.

Note that the first operational mode used in this example is the same as the initial operational mode used in the example embodiment of the invention described with respect to FIG. 3.

In step 415, a test is performed to determine if power has been applied to the SoC 300. If power has just been applied, it is assumed that all circuitry other than the MCPOR module 370 is held in reset until such time as the MCPOR module 370 has first had a chance to apply the configuration to the SoC 300.

In step 420, the pre-use configuration corresponding to the first chosen operational mode is "read" from the pre-use configuration NVM by the MCPOR module 370 and, in step 425, the values read are used to set up the clock frequencies and voltage levels for the cores 310 and 320 and the peripherals 330 and 340 of the SoC 300, respectively.

In step 430, the cores 310 and 320 and the peripherals 330 and 340 are taken out of reset, and the SoC 300 enters the first operational mode. As noted earlier, because this first operational mode is the same as the initial operational mode used in the invention embodiment of FIG. 3, the frequencies of the clocks driven to the cores 310 and 320 and the voltages driven to the peripherals 330 and 340, respectively, will correspond with the example of FIG. 3 and, to avoid repetition, they will not be described here further.

In step 435, the SoC 300 will execute boot-up code and potentially an operating system loader executive, and start normal operation in the first operational mode. Note that, in this step or just prior to this step (e.g., in step 430 and even to some extent in step 425), portions of the MCPOR 170/370 that are no longer needed during run-time operation of the SoC 300 may be selectively shut down to save power.

In step 440, the SoC 300 continues operation (e.g., steady state) in the first operational mode.

In step 445, during the course of running in the first operational mode, the SoC 300 may encounter a hardware reset, power loss, or restart interrupt. If it does, then flow returns to step 415, where a test for power is performed, and the previously described steps 420, 425, 430, 435, and 440 for reading the pre-use configuration and entering the first operational mode are repeated.

If the SoC 300 does not encounter a reset or power loss, the SoC 300 will continue execution in the first operational mode until the SoC 300 encounters a software-initiated change in the operational mode as occurs in step 450, where the operational mode is changed from the first operational mode to a third operational mode.

The third operational mode might or might not be restricted in various embodiments to one of the operational modes specified by the truth table 200 of FIG. 2 since this operational mode is under software control. For example, such a mode may gate off the clock 345 to the core 320 of the SoC 300 and change the clock 335 to the core 310 to a low frequency. Alternatively or additionally, the mode may place the peripheral 330 into an extra-low-power state by dropping its voltage to below the low voltage used in the first operational mode. In the example of FIG. 4, it is assumed that the third operational mode is different from the first operational mode.

In step 455, during the course of running in the third operational mode, the SoC 300 may encounter a hardware reset, power loss, or restart interrupt. If it does, then flow again returns to step 415, where a test for power is performed, and the previously described steps 420, 425, 430, 435, and 440 for reading the pre-use configuration and entering the first operational mode are repeated. Note that, in this case, even though the software had overridden the first operational mode that was entered upon first application of power, and the current operational mode is the third operational mode, after reset, the SoC 300 will again power up into the first operational mode.

Subsequent to the software putting the SoC 300 into the third operational mode in step 450 and running in that mode for a time, if the SoC 300 does not encounter a reset or power loss in step 455, then, in step 460, a second (i.e., different from the first and third) operational mode is written to the pre-use configuration NVM by the software, thereby overriding the configuration that was set by the system integrator. It may be that the rights to perform this operation for overwriting this pre-use configuration may be reserved for a very high privilege-level process running on the SoC, or correspond to an operation that can only be executed for an OS that has been "jail-broken."

Even though the pre-use configuration has been changed in the NVM, in step 465, the SoC 300 will continue to run in the third operational mode, unless the test of step 470 determines that a reset or power loss has occurred. If the test of step 470 is false, then the SoC 300 will continue operating in the third operational mode. If the test of step 470 is true, then the next step will be the test of step 475, which determines whether power has been restored (to the MCPOR module 370 at least). If it has, then, in step 480, the newly written configuration values that were written to the pre-use configuration NVM in step 460 (i.e., the second operational mode) will be read. In step 485, these values will be used by the MCPOR module 370 to determine new clock frequencies and voltage levels for the cores 310/320 and the peripherals 330/340, respectively. In step 490, the core and peripheral modules 310, 320, 330, and 340 of the SoC 300 are taken out of reset, and the SoC 300 enters the second operational mode. Since steps 480, 485, 490, and 495 follow a power-on reset or hardware reset as determined by the combination of steps 470 and 475, in step 495, the SoC 300 will again execute its boot and OS loader function.

Note that the flow chart 400 of FIG. 4 represents one example flow that illustrates certain potential occurrences in the operation of the SoC 100/300 of the present invention. However, the flow should not be considered to be restrictive of the various modes possible or the sequencing of events.

For example, in some embodiments, the SoC 100/300 may immediately program itself into a new operational mode that is different from the first operational mode, as soon as it is running long enough in the first operational mode to execute code for doing so. Further, the overwriting of the pre-use configuration NVM in step 460 following the test of step 455 is simply an illustrative example and not a necessary sequence.

Additionally, in some embodiments, following a write to the pre-use configuration NVM, the operating system may force the SoC 100/300 into a hard reset to enter the new operating mode. Alternatively, a write to the pre-use configuration NVM may cause a hardware reset or another low-level reset.

A "controller module" as used in the claims should be understood to include in scope the MCPOR 170/370 as described in the specification as well as more generally any power-on controller capable of performing the operations of the MCPOR and using related technologies such as ultra-low power, battery powered, "always-on" operations.

In the claims, the term "component module" should be understood to include in scope but not be limited to controller modules as defined above, as well as the core modules 110/310 and 120/320, the peripheral modules 130/330 and 140/340, and the clock and power sources modules 150/350 and 160/360.

In the claims, the term "power-on reset mode" should be understood to include in scope but not be limited to the operational mode of the device entered directly following the de-assertion of power-on reset, where the de-assertion of power-on reset is understood to normally follow the application of power to the IC, or occur as a result of a hardware reset due to an interrupt, a fault, or a programming step.

In the claims below, "pre-use configuration" of the IC is understood to include configuration of the IC at any point in time following the time of fabrication of the wafer that includes the IC.

In the claims, the term "fuse" is understood to include both fuses and anti-fuses, the varieties of which are known in the art.

Although the invention has been described in the context of a SoC, the invention may also be implemented in other types of integrated circuits and computer systems.

Other possible sequences and scenarios would be understood to one skilled in the art to be within the scope of the present invention.

Unless stated otherwise, terms such as "first," "second," and "third" are used to arbitrarily distinguish between the elements such terms describe. Thus, these terms are not necessarily intended to indicate temporal or other prioritization of such elements and are not to be interpreted as necessarily referencing similarly numbered elements in the embodiments of the specification. Further, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The invention claimed is:

1. An integrated circuit (IC), comprising:
   a controller module; and
   a plurality of component modules, each capable of operating in a plurality of different power modes, wherein the IC is designed to be selectively pre-use configured into any one of a plurality of different selectable power-on reset modes, the power-on reset modes including:
      a first power-on reset mode corresponding to the plurality of component modules operating in a first set of power modes; and
      a second power-on reset mode corresponding to the plurality of component modules operating in a second set of power modes different from the first set of power modes, such that:
         if the IC is pre-use configured with the first power-on reset mode, then, when the IC is powered up following the pre-use configuration, the controller module causes the component modules to operate directly in the first set of power modes; and
         if the IC is pre-use configured with the second power-on reset mode, then, when the IC is powered up following pre-use configuration, the controller module causes the component modules to operate directly in the second set of power modes, and
   wherein, until the pre-use-configured selected power-on reset mode is changed by programming the IC, the IC boots up in the pre-use configured selected power-on reset mode at each power-on reset of the IC.

2. The IC of claim 1 before being pre-use configured to have a selected power-on reset mode.

3. The IC of claim 1 after being pre-use configured to have a selected power-on reset mode.

4. The IC of claim 3, wherein, after the pre-use-configured IC is powered up the IC can be programmed to change the selected pre-use-configured power-on reset mode to a third power-on reset mode corresponding to the plurality of component modules operating in a third set of power modes, such that, upon a subsequent power-on reset of the IC, the controller causes the component modules to operate in the third set of power modes.

5. The IC of claim 1, wherein if the IC is pre-use configured with a power-on reset mode, then, when the IC is powered up following the pre-use configuration, it will subsequently selectively shut down portions of the controller module to save power.

6. The IC of claim 1, wherein:
   the first set of power modes comprises a first set of voltage levels and clock characteristics for the plurality of component modules; and
   the second set of power modes comprises a second set of voltage levels and clock characteristics for the plurality of component modules, wherein at least one of a voltage level and a clock characteristic of the second set of power modes is different from at least one of a corresponding voltage level and a corresponding clock characteristic of the first set of power modes.

7. The IC of claim 6, wherein the clock characteristics comprise at least one of clock frequency and a clock gating.

8. The IC of claim 1, wherein the IC is pre-use configurable by selectively configuring hardware within the IC.

9. The IC of claim 1, wherein the IC is pre-use configurable by selectively burning one or more fuses within the IC.

10. The IC of claim 1, wherein the IC is pre-use configurable by selectively configuring non-volatile memory of the IC.

11. The IC of claim 1, wherein the IC is pre-use configurable by selectively configuring external wiring to the IC.

* * * * *